UNITED STATES PATENT OFFICE.

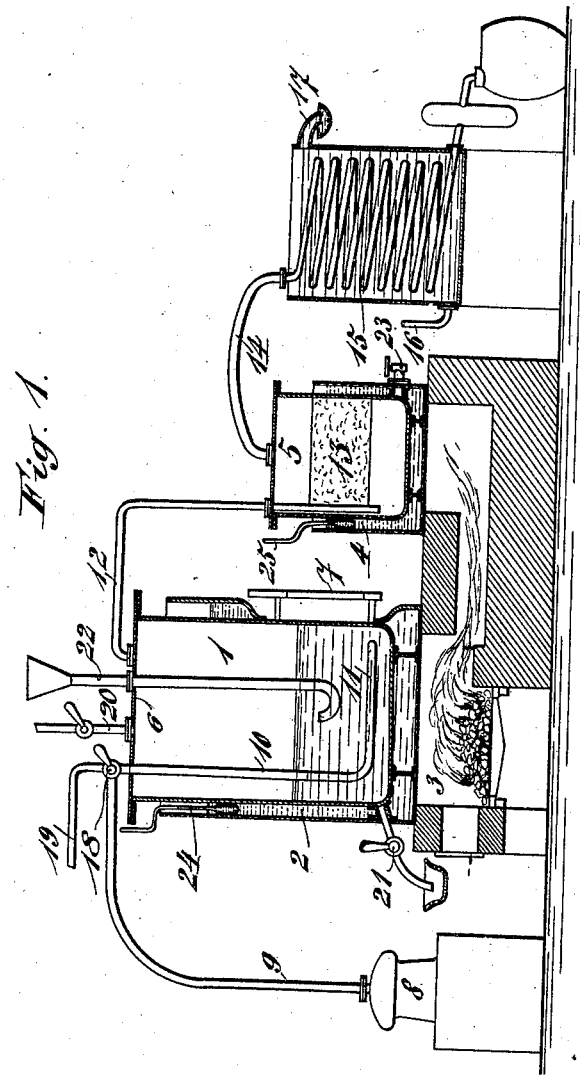

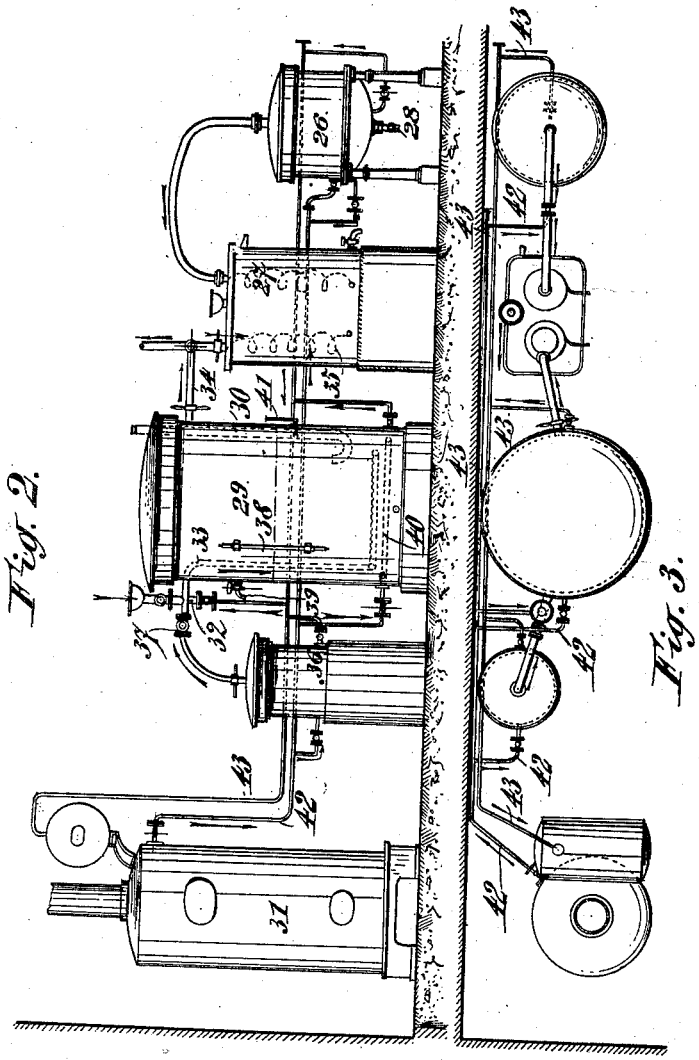

EDOUARD DOUILLET, OF LA GARENNE-COLOMBES, FRANCE.

APPARATUS FOR REFINING OILS.

SPECIFICATION forming part of Letters Patent No. 707,960, dated August 26, 1902.

Original application filed June 14, 1901, Serial No. 64,585. Divided and this application filed September 9, 1901. Serial No. 74,762. (No model.)

*To all whom it may concern:*

Be it known that I, EDOUARD DOUILLET, a citizen of the French Republic, and a resident of La Garenne-Colombes, Seine, France, have invented certain new and useful Improvements in Apparatus for Refining Oils, of which the following is a specification, this being a division of my prior application, Serial No. 64,585, filed June 14, 1901.

This invention relates to the purification of oils and similar substances, such as grease, tallow, glycerin, vaseline, wax, and other fatty substances.

The accompanying drawings, given by way of example, show an installation for refining by means of alcohol, steam, and animal charcoal, as well as an installation in which benzin or sulfite of carbon are used conjointly with the said agents.

Figure 1 is an elevation of the first-named installation. Fig. 2 represents in elevation the second kind of installation. Fig. 3 is a plan view of the latter.

The apparatus in which the refining takes place consists of a tank 1, placed in another tank 2, containing chlorid of calcium or any other solution capable of a temperature of about 150° Fahrenheit. This tank 2 is heated at the bottom by means of a furnace 3, serving also to heat a similar bath 4, surrounding the vessel 5, the use of which will be hereinafter described. Chlorid of calcium of ordinary strength is preferably used for the reason that the gases emitted therefrom when the chlorid is subjected to heat are of greater temperature than other solutions. In short, it is used for its heating propensities. The tank 1 is hermetically closed by means of a cover 6, the level of the oil being shown by the tube 7. The alcoholic vapor is produced by the alembic 8 and passes through the tube 9 into the descending-tube 10, which passes through the cover 8 and ends near the bottom in a circular tube 11, provided with a plurality of holes through which the alcoholic vapor escapes, passing through the mass of oil. This vapor escapes through the tube 12 and is conducted into the bottom part of the receptacle 5, serving to filter the alcohol by means of the potash contained in the basket 13, and is maintained at a high temperature by a solution similar to that in the tank 1. The filtered alcohol escapes through the tube 14 to enter the serpentine 15, wherein the alcohol is condensed and is collected in a suitable receptacle, while the cooling-water arrives through the pipe 16 and overflows through the pipe 17. The alcohol is passed through the potash for the purpose of purifying it and preparing it for a second operation. After the alcohol has been allowed to act during a sufficient time steam is then brought to bear upon the mass. For this purpose the tube 10 is furnished with a three-way cock 18, and steam is then introduced by means of the pipe 19, the cock being turned so as to shut off the communication with the alcohol-alembic. The steam escapes through the pipe 20, furnished with a cock closed during the action by alcohol. After the action by steam the refined oil is drawn off by the cock 21 and a fresh quantity is introduced through the funnel-tube 22, which is bent at its lower end, so as to prevent any admission of air. The refined oil is then filtered through animal charcoal and carbonate of magnesia. A cock 23 allows the solution of potash formed by the water conveyed into the vessel 5 by the alcohol to be drawn off. Thermometers 24 25 are placed in the baths of chlorid of calcium in order to maintain the temperature below boiling-point.

In the form of execution shown in Figs. 2 and 3, 26 is an alembic heated by steam and containing benzin or sulfid of carbon in which the fatty matters to be treated have been previously dissolved. As a rule, inasmuch as reference is had principally to fatty bodies having already been used, and consequently containing foreign matter, it is necessary to use a suitable solvent, such as benzin or bisulfid of carbon, in which the matter to be treated is immersed and which extracts the fatty bodies and permits by simply filtering the separation of the foreign matter. Besides this, the solvents used in a largely diluted state permit the discoloration by their passing over the animal carbon of the fatty bodies, which resist the action of the animal carbon when not greatly diluted with these solvents. This operation should be performed prior to the separation of the solvent by distillation. After distilling, the object of which is to recuperate the benzin or sulfid of carbon condensed in the cooling-serpentine 27, the substances forced by a pump into the purifier 29 are run out through the cock 28, the said substances entering by the tube 30, bent at its end to prevent air from entering therein. This end is immersed in the bath. Steam is then used, being supplied from a generator 31 and entering through 32 to leave through the horizontal portion of the perforated tube 33. This steam passes through the mass under treatment. It may be allowed to escape through 34 or be recuperated in the cooling-serpentine 35. After the steam has performed its work the alcoholic vapor is brought into operation. This alcoholic vapor is produced by the alembic 36, heated by steam furnished by the generator 31, and passes through the contents of the purifier 29. It enters by 31 and acts in the same way as the steam, which enters by the tube 33 and is condensed in the serpentine 35, returning from thence to the alembic 36. When the condensations of water or alcohol have increased the volume of the substance treated, as shown by the indicator-level 38, fitted to the purifier 29, they are drawn off through the cock 39, placed above the level of the substance to be treated. In order to maintain a high temperature in the substance under treatment, a serpentine 40 is placed at the base of the filter 29. This serpentine is heated by steam supplied by the generator. Should this heat be insufficient, the purifier 29 is immersed in a bath of chlorid of calcium or any other suitable solution giving a temperature of about 50°. A thermometer placed at 41 indicates the temperature of the substances under treatment. The steam-piping conveying the steam from the generator to the apparatus is shown by 42 and the return-pipes for condensed steam by 43.

The above-described process is applied to the purifying of oils, grease, tallow, glycerin, vaseline, wax, and other fatty substances having been used in industrial operations, also preserving-oils and lubricating substances having passed through working parts of machines, glycerin which has been used in refrigerating processes, and the like substances.

Having fully described my invention, what I desire to secure by Letters Patent is—

1. In an apparatus for refining oil and the like, a suitable purifying or filtering apparatus, means for heating the same, a serpentine connected to said purifying or filtering apparatus, a suitable source of steam-supply, means connected thereto for subjecting the mass under treatment to the action of the steam, an alembic, and means connected thereto for subjecting the mass under treatment to alcoholic vapors, substantially as described.

2. In an apparatus for refining oil and the like, the combination of a furnace, a tank 1, a tank 2 surrounding said tank 1, a vessel 5 arranged in a casing forming a space between said vessel, an alembic, a pipe connected to said alembic and passing through the cover of said tank 1, extending downwardly into said tank, said pipe being bent near the bottom of tank 1 and having perforations formed therein, a pipe 12 forming an outlet from tank 1 at its top and downwardly extending into the bottom of said vessel 5, a filtering agent in said vessel 5, an outlet-pipe 14 connected with a serpentine arranged within a suitable vessel, and a suitable outlet, all parts being arranged substantially as shown for the purpose set forth.

3. In an apparatus for refining oil and the like, a tank, a tank of less diameter mounted therein, an alembic, a pipe connected thereto and extending into said inner tank, a pipe communicating with a suitable steam-supply and connected to said pipe, a purifier comprising a tank mounted within a tank, a furnace for heating both of said outer tanks, a cooling-serpentine within a suitable vessel connected to said purifier, and an outlet in said vessel, substantially as described.

In testimony whereof I have hereunto set my hand in presence of two witnesses.

EDOUARD DOUILLET.

Witnesses:
 ADOLPHE STURM,
 EDWARD P. MACLEAN.